United States Patent
Engl et al.

(10) Patent No.: US 12,214,840 B2
(45) Date of Patent: Feb. 4, 2025

(54) REMOVABLE WINDSCREEN ARRANGEMENT FOR A TILTING VEHICLE

(71) Applicant: Bayerische Motoren Werke Aktiengesellschaft, Munich (DE)

(72) Inventors: Richard Engl, Munich (DE); Jens Wasser, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 17/790,188

(22) PCT Filed: Feb. 15, 2021

(86) PCT No.: PCT/EP2021/053574
§ 371 (c)(1),
(2) Date: Jun. 30, 2022

(87) PCT Pub. No.: WO2021/197702
PCT Pub. Date: Oct. 7, 2021

(65) Prior Publication Data
US 2023/0042667 A1  Feb. 9, 2023

(30) Foreign Application Priority Data

Apr. 2, 2020 (DE) .................. 10 2020 109 198.2

(51) Int. Cl.
B62J 17/04 (2006.01)
(52) U.S. Cl.
CPC .................... B62J 17/04 (2013.01)
(58) Field of Classification Search
CPC ................ B62J 17/02; B62J 17/04
USPC ......................................... 296/78.1
See application file for complete search history.

(56) References Cited

U.S. PATENT DOCUMENTS

| 5,732,965 A | 3/1998 | Willey |
| 5,853,217 A | 12/1998 | Armstrong |
| 6,789,835 B2 * | 9/2004 | Wargin .................... B62J 17/04 296/78.1 |
| 7,090,280 B2 * | 8/2006 | Willey .................... B62J 17/04 296/78.1 |

(Continued)

FOREIGN PATENT DOCUMENTS

| DE | 102 30 915 A1 | 1/2004 | |
| GB | 689793 A * | 4/1953 | .............. B62J 17/04 |

(Continued)

OTHER PUBLICATIONS

International Search Report (PCT/ISA/210) issued in PCT Application No. PCT/EP2021/053574 dated May 19, 2021 with English translation (four (4) pages).

(Continued)

*Primary Examiner* — Jason S Morrow
(74) *Attorney, Agent, or Firm* — Crowell & Moring LLP

(57) ABSTRACT

A windscreen arrangement for fastening to a vehicle, in particular to a tilting vehicle, is provided, with a windscreen for at least partially deflecting a headwind during use of the vehicle, and with a securing device for fastening the windscreen to the vehicle, wherein the securing device has at least one connecting portion and at least one latching portion which are each designed for releasably connecting to the vehicle. In addition, a vehicle with a corresponding windscreen arrangement is provided.

11 Claims, 4 Drawing Sheets

(56) References Cited

U.S. PATENT DOCUMENTS

| | | | | |
|---|---|---|---|---|
| 7,946,632 B1* | 5/2011 | Mueller | ............... | B62J 1/28 |
| | | | | 292/DIG. 63 |
| 8,469,624 B2* | 6/2013 | Carrabs | ............ | F16B 41/002 |
| | | | | 403/370 |
| 8,651,551 B2* | 2/2014 | Fukuda | ............ | B62J 17/04 |
| | | | | 280/124.1 |
| 9,394,859 B2* | 7/2016 | Parnofiello | ......... | B60K 28/02 |
| 10,272,966 B2* | 4/2019 | Maffe' | ............ | B62J 27/00 |
| 2006/0087143 A1* | 4/2006 | Willey | ............ | B62J 17/04 |
| | | | | 296/78.1 |
| 2012/0186065 A1* | 7/2012 | Willey | ............ | B62J 17/04 |
| | | | | 248/201 |
| 2012/0248812 A1* | 10/2012 | Fukuda | ............ | B62J 17/04 |
| | | | | 296/78.1 |

FOREIGN PATENT DOCUMENTS

| | | | |
|---|---|---|---|
| GB | | 827330 A | 2/1960 |
| WO | WO 2016/009349 A | | 1/2016 |

OTHER PUBLICATIONS

German-language Written Opinion (PCT/ISA/237) issued in PCT Application No. PCT/EP2021/053574 dated May 19, 2021 (six (6) pages).

German-language Search Report issued in German Application No. 10 2020 109 198.2 dated Jan. 25, 2022 with English translation (13 pages).

\* cited by examiner

REMOVABLE WINDSCREEN ARRANGEMENT FOR A TILTING VEHICLE

BACKGROUND AND SUMMARY

The invention relates to a windscreen arrangement for securing to a vehicle, in particular to a tilting vehicle, and a vehicle having a corresponding windscreen arrangement.

Windscreens are used in particular for motorcycles, but also for other vehicles, in extremely varied embodiments. Generally, they are securely fixed to the vehicle and can be constructed in a static or adjustable manner. Depending on the current requirement, the adjustable windscreen arrangements, using sometimes very differently configured adjustment apparatuses, enable a variation in terms of position and action to be carried out.

DE 102 30 915 A1 discloses, for example, an adjustable windscreen which can be moved between an upper and lower position, wherein the lower position enables a specific off-road capability.

Known windscreen arrangements, whether static or adjustable, have in common that they have to be fixed to the vehicle in a secure and solid manner in every travel state. Accordingly, assembly and disassembly require a degree of complexity and an additional tool.

An object of the invention is therefore to provide a windscreen arrangement for securing to a vehicle which enables the simplest possible assembly and disassembly.

This object is achieved with a windscreen arrangement and a vehicle having such a windscreen arrangement in accordance with the independent claims. Advantageous embodiments will be appreciated from the dependent patent claims in each case.

Accordingly, a windscreen arrangement for securing to a vehicle, in particular a tilting vehicle, is provided, having a windscreen for (at least partially) deflecting a headwind when the vehicle is used, and a securing apparatus for securing the windscreen to the vehicle, wherein the securing apparatus has at least one connection portion and at least one locking portion which are constructed in each case for releasable connection to the vehicle.

In principle, all land vehicles, water-borne vehicles and aircraft which have a corresponding windscreen arrangement are considered as vehicles in the context of this description. With land vehicles, a use in addition to passenger vehicles and trucks is also possible with other motor-driven vehicles, such as, for example, three-wheeled vehicles or quad bikes.

According to a preferred embodiment, however, the vehicle is constructed as a so-called tilting vehicle. A tilting vehicle is intended to be understood to be inter alia motorcycles or motorcycle-like motor vehicles, such as motor scooters, in particular tiltable two-, three- or four-wheeled motor scooters, scooters or the like.

The windscreen arrangement thus has the securing apparatus which is constructed to secure the windscreen to the vehicle. To this end, the securing apparatus may, for example, be connected, on the one hand, to the rear side of the windscreen and, on the other hand (in the installed state), secured to the vehicle. The securing apparatus comprises according to the invention one or more connection portions and one or more locking portions. These are constructed in such a manner that the connection to the vehicle can be released when necessary. In this manner, the windscreen arrangement can be particularly easily disassembled from the vehicle or mounted (again). Only the at least one locking connection has to be released and the at least one connection portion has to be moved out of engagement with the vehicle. This can preferably be carried out manually without the use of an additional tool.

For example, the at least one connection portion may be constructed in a cylindrical, tapered or conical manner and be provided for coaxial engagement in at least one vehicle-side receiving member of the vehicle. In any case, as a result of the described geometric configurations, the at least one connection portion is constructed as an insertion portion and can consequently be readily inserted for assembly in the associated vehicle-side receiving member. In the case of disassembly, the connection portion can also be readily removed from the associated vehicle-side receiving member. The respective vehicle-side receiving member is preferably formed in a complementary manner to the associated connection portion. In this manner, the most optimum fit possible can be provided so that the respective connection portion in the assembled state can as far as possible be secured to the vehicle in a precisely fitting and play-free manner (or at least with less or reduced play).

Furthermore, a position of the at least one connection portion may be constructed to be able to be adjusted in the direction of a main axis of the connection portion with respect to the windscreen. This means that the respective connection portion can be adjusted and can consequently be moved or displaced in the longitudinal direction thereof, the main direction. This configuration affords the possibility of carrying out a tolerance compensation, where necessary, in order to ensure as far as possible a precisely fitting position of the connection portion.

For example, the adjustment of the respective connection portion can be carried out by means of a thread which is provided accordingly on or in the respective connection portion so that the connection portion can be readily adjusted by a corresponding rotational movement. A securing against a release of the connection portion can preferably be achieved by means of counter-nuts and/or knurled screws.

The at least one locking portion of the windscreen arrangement may be configured in such a manner that the respective locking portion comprises a recess for at least partially engaging around a vehicle-side retention portion. The respective locking portion may, for example, be fitted with the recess on the vehicle-side retention portion so that the recess at least partially engages around the retention portion. For example, the respective locking portion may to this end have a substantially U-shaped region which carries the recess so that the vehicle-side retention portion is surrounded by this recess defined by the U-shape.

Furthermore, the at least one locking portion may further comprise a closure element which can be moved relative to the recess and which can be moved between an open position and a closed position and which in the closed position closes an opening of the recess in such a manner that the associated vehicle-side retention portion in a state installed on the vehicle can be retained in the recess.

The closure element may, for example, be a blocking bar or a blocking lever which can be moved in each case between the two positions, the open position and the closed position. In the closed position, the vehicle-side retention portion (in the installed state) is retained in the recess. This means that the vehicle-side retention portion is arranged and retained between a wall, which delimits the recess, of the mentioned region and the closure element.

If the respective closure element is in the form of a blocking lever, the kinematics thereof may have a dead center. This enables the blocking lever to be able to be released or locked by brief excess pressure (the dead center). An unintentional activation can consequently be prevented. Alternatively or additionally, another mechanical securing system which prevents a release of the blocking lever may be provided. For example, there may be provided a stop which blocks the blocking lever in the installed state or in an installation state of the windscreen arrangement against activation. For example, the mechanical securing system can be rigidly fixed to the associated locking portion or can be in the form of a stop which can be rotated relative to the locking portion and which blocks the closure element at least in the installation position and consequently secures it against unintentional opening.

The at least one closure element may in all its embodiments be provided as the sole locking system so that the entire windscreen arrangement can be fixed and secured to the vehicle by this locking system alone. This enables an easy manual assembly without the use of an additional tool.

For a disassembly of the windscreen from the vehicle, for example, the respective closure element is moved into the open position so that the opening of the recess is opened. The vehicle-side retention portion which is already arranged therein can subsequently be removed from the recess.

In order to prevent a disassembly which the user does not desire, for example, a theft, the closure element can be blocked. For example, both the closure element and the region of the locking portion which carries the recess may each have a hole, wherein the two holes are in alignment with each other in the closed state of the closure element. In this instance, for example, a lock, in particular a padlock, may engage in both holes and consequently secure the entire windscreen arrangement.

Preferably, the at least one connection portion and the at least one locking portion may be orientated in such a manner that the opening of the recess and the main axis of the connection portion face together in one direction, in particular an insertion direction. This enables, for example, the entire windscreen arrangement to be able to be "placed on" the vehicle in one direction, the insertion direction. In this instance, the at least one connection portion is inserted into the respective associated vehicle-side receiving member and the at least one locking portion engages around the vehicle-side retention portion with the respective recess thereof.

Alternatively, however, the windscreen arrangement can also be secured to the vehicle in another manner. The windscreen arrangement can thus in a first step initially be connected by means of the at least one locking portion to the vehicle-side retention portion by the recess being fitted to the vehicle side retention portion. In this instance, the windscreen arrangement is preferably orientated in a (temporary) position tilted forward in the travel direction. Subsequently, the at least one closure element is moved into the closure position in order to prevent a release of the at least one locking portion from the vehicle-side retention portion. In a subsequent step, the entire windscreen arrangement is rotated counter to the travel direction into the desired position, the installation position. In this instance, the vehicle-side retention portion acts as a rotation axis. In the installation position, the at least one connection portion is connected to the associated vehicle-side receiving member. For example, in this instance the at least one connection portion is moved in the longitudinal direction thereof by means of a thread which is provided in or on the connection portion in the direction of the vehicle-side receiving member in order to produce the desired engagement. A securing action against release of the engagement can be carried out by means of the described counter-nuts and/or knurled screws.

In addition, a mechanical securing system, for example, in the form of a stop, which blocks the closure element in the installation position and consequently secures it against unintentional opening may be provided.

Also in the case of this alternative fixing method, the at least one connection portion and the at least one locking portion may be orientated in such a manner that the opening of the recess and the main axis of the connection portion face together in a common direction.

According to an embodiment, the respective closure element may be geometrically configured in such a manner that the closure element during fitting to the vehicle independently opens and releases the recess for introducing the vehicle-side retention portion. To this end, an outer contour of the closure element may be configured in a chamfered and/or rounded manner so that the closure element laterally deviates when in contact with the retention portion and consequently brings about an opening of the closure element.

Furthermore, a vehicle having a windscreen arrangement for (at least partially) deflecting a headwind when the vehicle is used is provided, wherein the windscreen arrangement is constructed according to this description.

In this instance, the at least one vehicle-side receiving member for coaxial engagement of the at least one connection portion may be constructed at an upper end of a front wheel fork of the vehicle, in particular at an upper end of a fork leg, a stand tube or an immersion tube of the front wheel fork. Optionally, the receiving member may be integrated therein in the closure caps or fork plugs. Alternatively, the respective vehicle-side receiving member may be provided on or in an upper or lower fork bridge.

Furthermore, as described above, the at least one vehicle-side receiving member may be formed so as to complement the at least one connection portion.

According to a preferred embodiment, the at least one vehicle-side retention portion may comprise at least one continuation which is orientated in a substantially horizontal manner and which is retained in the at least one locking portion.

The windscreen arrangement described thus on the whole enables the securing apparatus to be able to be fitted in a particularly simple manner from above onto the vehicle. Using the closure elements, a simple activation without any additional tool is enabled and the entire windscreen arrangement is thereby fixed to the vehicle and reliably secured.

The invention is explained in greater detail below with reference to an embodiment and the drawings.

DETAILED DESCRIPTION OF THE DRAWINGS

Figure 1:
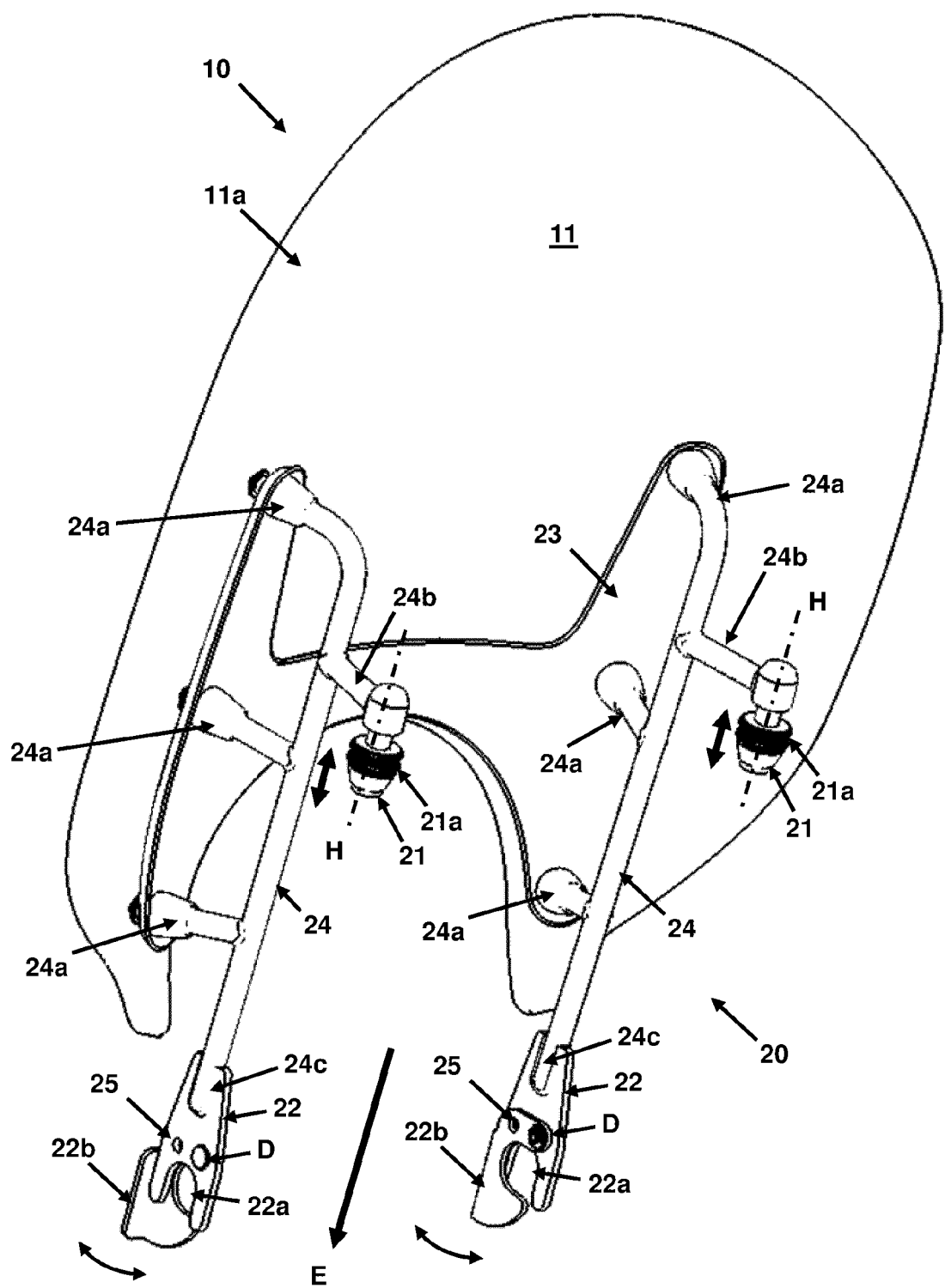
FIG. 1 is a perspective view of a windscreen arrangement according to the description.
Figure 2:
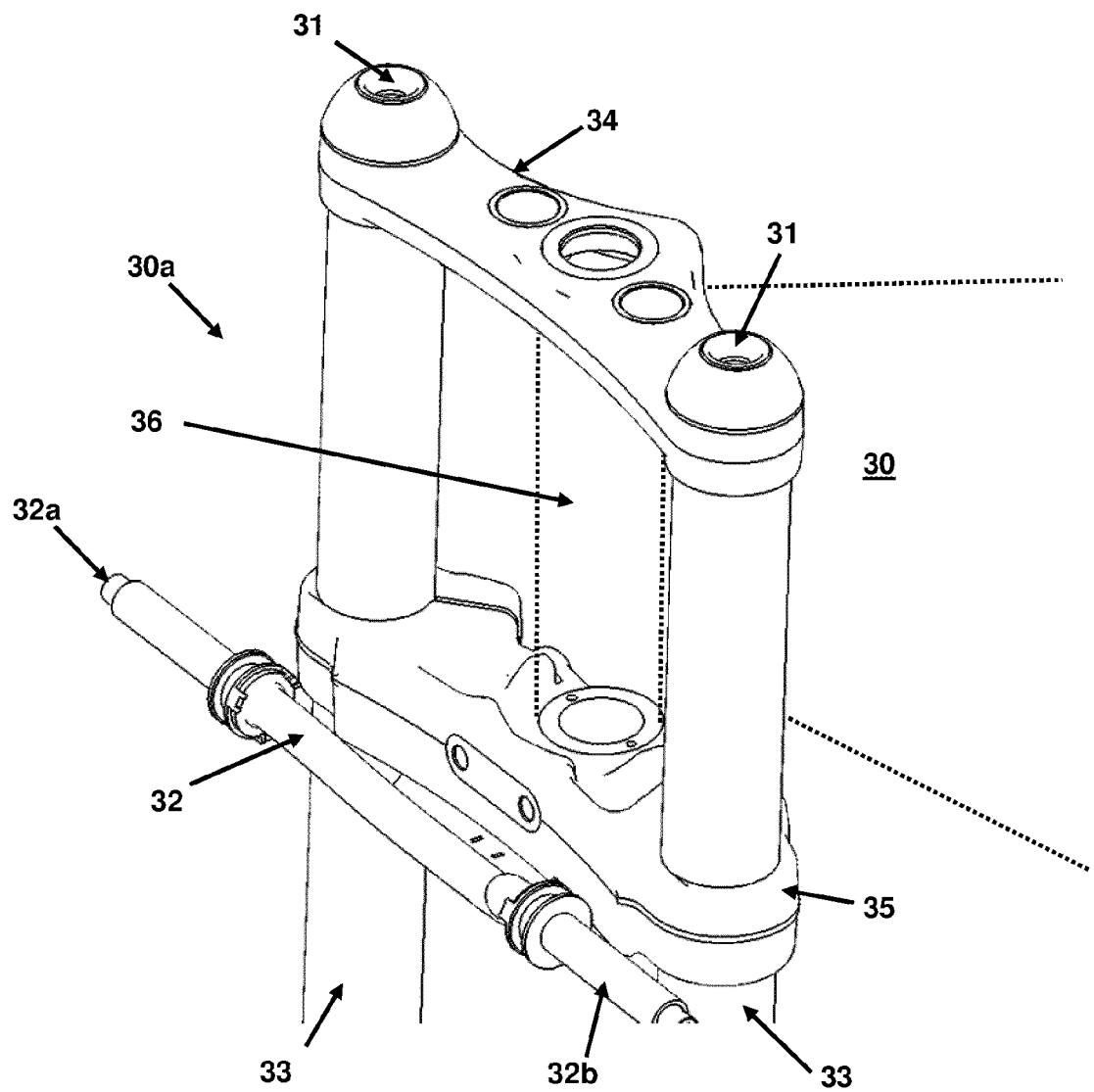
FIG. 2 is a view of a front wheel fork of a vehicle for receiving the windscreen arrangement according to FIG. 1.

FIG. 1 shows a windscreen arrangement 10 for securing to a vehicle 30 which is in the form, for example, of a motorcycle and which is illustrated in FIG. 2 only partially and schematically. The windscreen arrangement 10 comprises a windscreen 11 which is constructed for at least partially deflecting a headwind when the motorcycle 30 is used. Purely by way of example, the windscreen 11 is illustrated as a transparent pane. Of course, the windscreen 11 may be constructed to be only partially transparent, but where necessary also completely non-transparent. At a rear side 11a of the windscreen 11 facing the driver there is provided a securing apparatus 20 which is constructed to secure the windscreen 11 to the vehicle 30. To this end, the securing apparatus 20 has two connection portions 21 and furthermore two locking portions 22 which are constructed in each case for releasable connection to the (remaining) vehicle 30.

In the embodiment illustrated, the securing apparatus 20 further comprises a planar windscreen receiving member 23 for directly connecting the securing apparatus 20 to the windscreen 11. For example, this indirect connection can be carried out using fasteners 12 (FIG. 3), such as screws or rivets, or by means of a materially engaging connection, such as adhesive bonding. At a side of the windscreen receiving member 23 facing away from the windscreen 11, there are fitted two carrier structures 24 which are connected in each case by means of three arm continuations 24a to the windscreen receiving member 23. Of course, in place of the three arm continuations 24a, any other number of continuations or another type of connection to the windscreen receiving member 23 can be provided.

Another carrier arm 24b faces in each case in the opposite direction, that is to say, away from the windscreen 11, and is connected at the outer (angled) end thereof to one of the two connection portions 21 of the securing apparatus 20.

The respective locking portion 22 is provided at a respective lower end 24c of the two carrier structures 24.

As can be seen in particular in FIG. 1, the two connection portions 21 in the illustrated embodiment are constructed in each case in a conical manner and consequently provided for coaxial engagement in a vehicle-side receiving member 31 of the vehicle 30 in each case (illustrated in FIG. 2). Alternatively, however, the connection portions 21 may also be constructed in a cylindrical or conical manner (not illustrated).

Each of the two connection portions 21 is constructed in such a manner that a position of the connection portion 21 is constructed so as to be able to be adjusted in the direction of a main axis H of the connection portion 21 with respect to the windscreen 11. The adjustability is, for example, achieved by means of a thread which is provided on or in the connection portion 21 so that an adjustment of the respective connection portion 21 in the longitudinal direction thereof, coaxially relative to the main axis H, is readily enabled by means of a rotational movement. A securing action against release of the connection portion 21 can preferably be achieved by means of knurled screws 21a or counter-nuts.

Figure 3:
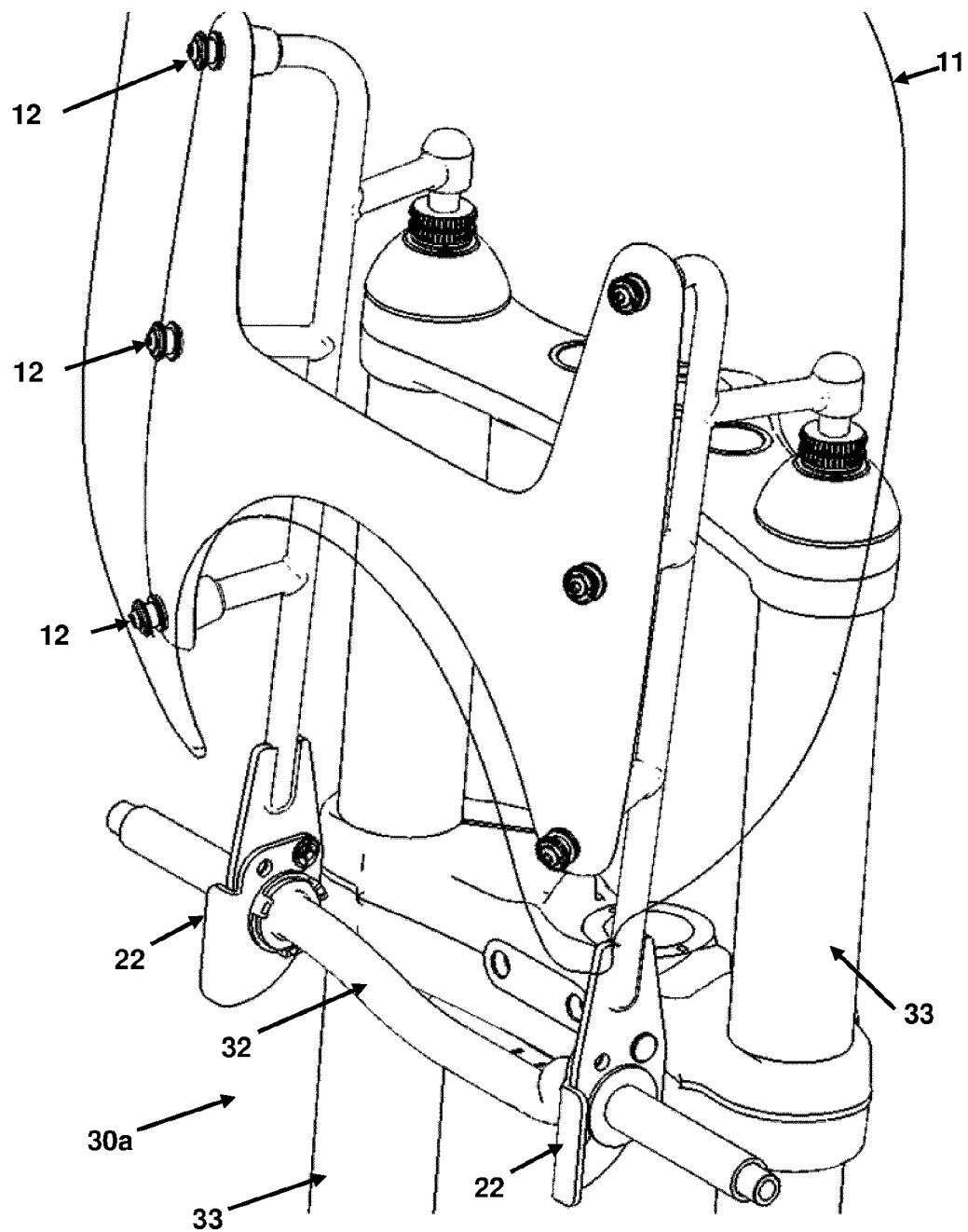
FIG. 3 illustrates a vehicle having the windscreen arrangement according to FIG. 1.

The two locking portions 22 are constructed in such a manner that each locking portion 22 comprises a recess 22a for at least partially engaging around a vehicle-side retention portion 32 (illustrated in FIGS. 2 and 3). The respective recess 22a is orientated in such a manner that the locking portion 22 can be placed therewith on the vehicle-side retention portion 32. In the embodiment illustrated, the locking portion 22 has to this end a region which carries the recess 22 and which is constructed in a substantially U-shaped manner.

In addition, each of the two locking portions 22 further comprises a closure element 22b which can be moved relative to the recess 22a and which can be moved between an open position and a closed position (the closed position is illustrated), and in the closed position closes an opening of the recess 22a in such a manner that the vehicle-side retention portion 32 in a state installed on the vehicle can be retained in the recess 22a.

The closure element 22b is to this end constructed as a blocking lever which is constructed in a hook-like manner and consequently can engage in a U-shaped manner around and retain the vehicle-side retention portion 32. The hook-like configuration of the respective closure element 22b enables the closure element 22b during fitting to the vehicle-side retention portion 32 to independently open and to release the recess 22a for introducing the vehicle-side retention portion 32. This is achieved by means of a substantially chamfered and/or rounded outer contour of the closure element 22b which, when in contact with the vehicle-side retention portion 32, brings about a lateral deviation about a rotation axis D and a resultant opening of the closure element 22b. By means of a restoring spring, the closure element 22b can subsequently be returned to the closed position again.

In order to prevent an undesirable disassembly, for example, to prevent a theft, the closure element 22b can be blocked. To this end, both the closure element 22b and the remaining locking portion 22 (that is to say, the region which carries the recess 22a) have a hole 25 in each case, wherein the two holes 25 of each locking portion 22 are in alignment with each other in the closed state of the closure element. It is thus possible, for example, to use a lock which engages in both holes 25 and secures the entre windscreen arrangement 10 to the vehicle 30.

It has been found to be advantageous in the illustrated embodiment for the opening of the recess 22a and the main axis H of the respective connection portion 21 to face together in the direction of an insertion direction E. The opening thus faces in the same direction as the main axis H and the insertion direction E.

This enables the described windscreen arrangement 10 to be fitted from above to the front wheel suspension 30a (illustrated in FIG. 2) of the motorcycle 30. Of course, the vehicle 30 may also be a different vehicle in the context of this description.

The front wheel suspension 30a of the motorcycle 30 is illustrated as a front wheel fork and comprises two fork legs 33 which generally each have an immersion tube and a stand tube which can be moved relative thereto. The two fork legs 33 are arranged spaced apart from each other by means of two fork bridges 34, 35. The fork bridges 34, 35 themselves are additionally connected by means of a control tube which is retained in a steering head 36 (depicted only schematically) so as to be able to be moved in rotation relative to a vehicle structure, in this instance the motorcycle frame.

In the embodiment illustrated, the two vehicle-side receiving members 31 are constructed for coaxial engagement of the respective connection portion 21 on an upper end of the front wheel suspension 30a, that is to say, at a respective upper end of the two fork legs 33. In this instance, receiving, for example, in the closure caps or fork plugs (if provided) is optionally possible. The corresponding upper end may, for example, be provided by the stand tube (as illustrated), but a transposed arrangement of the forks legs 33 is also possible, in which the stand tube provides the upper end of the respective fork leg 33.

Alternatively and therefore not illustrated, the respective vehicle-side receiving member 3 may, for example, be formed on the upper fork bridge 34 or lower fork bridge 35.

In any case, the two vehicle-side receiving members 31 are formed so as to complement the respective associated connection portion 21 and have a correspondingly conical shape.

In addition, the vehicle-side retention portion 32 which is connected by way of example to the lower fork bridge 35 is provided. Alternatively, however, a connection to the upper fork bridge 34 or one or both fork legs 33 would also be possible.

The vehicle-side retention portion 32 is constructed in a curved manner and comprises two substantially horizontally orientated continuations 32a, 32b which are formed by the two ends thereof. They are retained in the installed state according to FIG. 3 in one of the two locking portions 22.

Figure 4:
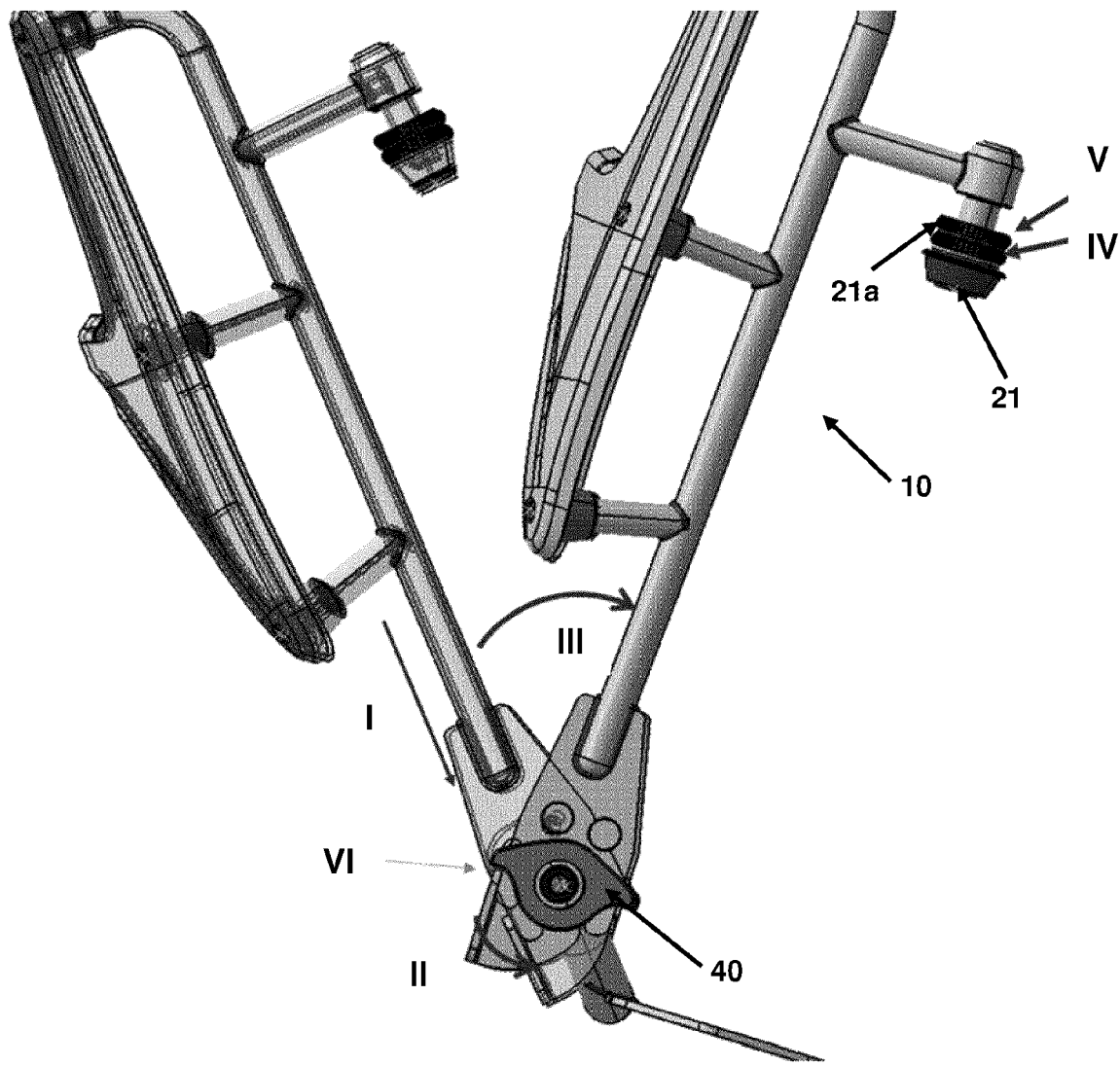
FIG. 4 illustrates an alternative assembly sequence for the windscreen arrangement.

FIG. 4 shows an alternative assembly sequence for the insertion movement E for the windscreen arrangement 10 from FIGS. 1 to 3. The windscreen arrangement 10 can thus in a first step I initially be connected by means of the two locking portions 22 (as a result of the lateral view only one locking portion 22 can be seen) to the vehicle-side retention portion 32 by the recesses 22a being fitted on the vehicle-side retention portion 32. In this instance, the windscreen arrangement 10 is orientated in a (temporary) position tilted forward in the travel direction. Subsequently, the respective closure element 22b is moved into the closure position (step II) in order to prevent a release of the locking portions 22 from the vehicle-side retention portion 32. In a subsequent step III, the entire windscreen arrangement 10 is rotated counter to the travel direction into the desired position, the installation position. In this instance, the vehicle-side retention portion 32 acts as a rotation axis. In the installation position, the two connection portions 21 are connected to the associated vehicle-side receiving member 31. The connection portions 21 are moved in the longitudinal direction thereof in the direction of the vehicle-side receiving member 31 (step IV) in order to produce the desired engagement. For example, the adjustment or movement of the respective connection portion 21 can be carried out by means of the described thread.

A securing action against a release of the engagement can be provided by means of the knurled screws 21 (step V). In addition, a mechanical securing system 40, for example, in the form of a stop 40 which is rigidly secured to the looking portion 22 or in the form of a stop 40 which can be rotated relative to the locking portion 22 may be provided and blocks the closure element 22b in the illustrated installation position and consequently secures it against unintentional opening.

What is claimed is:

1. A windscreen arrangement to be secured to a vehicle, comprising:
   a windscreen for at least partially deflecting a headwind when the vehicle is used; and
   a securing apparatus for securing the windscreen to the vehicle, wherein the securing apparatus comprises at least one connection portion and at least one locking portion which are constructed in each case for releasable connection to the vehicle;
   wherein the at least one locking portion comprises a recess for at least partially engaging around a vehicle-side retention portion, and an opening of the recess and a main axis of the connection portion face together in an insertion direction of the connection portion.

2. The windscreen arrangement according to claim 1, wherein
   the vehicle is a tilting vehicle.

3. The windscreen arrangement according to claim 1, wherein
   the at least one connection portion is constructed in a cylindrical, tapered or conical manner about the main axis, and is configured for coaxial engagement in at least one vehicle-side receiving member of the vehicle.

4. The windscreen arrangement according to claim 3, wherein
   a position of the connection portion is constructed to be able to be adjusted in a direction of the main axis of the connection portion with respect to the windscreen.

5. The windscreen arrangement according to claim 1, wherein
   the at least one locking portion further comprises a closure element which is rotatable relative to the recess about an axis, between a closed position and an open position, in response to contact with the vehicle-side retention portion, and
   in the closed position, the closure element closes the opening of the recess such that the vehicle-side retention portion, in a state installed on the vehicle, is retained in the recess.

6. The windscreen arrangement according to claim 1, wherein
   the at least one locking portion further comprises a closure element which is movable relative to the recess and which is movable between an open position and a closed position, and
   in the closed position, the closure element closes the opening of the recess such that the vehicle-side retention portion, in a state installed on the vehicle, is retained in the recess.

7. A vehicle comprising a windscreen arrangement according to claim 1.

8. The vehicle according to claim 7, comprising:
   a front wheel fork, wherein at least one vehicle-side receiving member for coaxial engagement of the at least one connection portion is constructed at an upper end of the front wheel fork.

9. The vehicle according to claim 8, wherein
   the at least one vehicle-side receiving member is constructed at an upper end of a fork leg, a stand tube or an immersion tube of the front wheel fork.

10. The vehicle according to claim 7, wherein
    the at least one vehicle-side receiving member is formed so as to complement the respective connection portion.

11. The vehicle according to at least one of claim 7, wherein
    the at least one vehicle-side retention portion comprises at least one continuation portion which is orientated in a substantially horizontal manner and which is retained in the at least one locking portion.

* * * * *